US011323184B2

(12) United States Patent
Razzell (10) Patent No.: US 11,323,184 B2
(45) Date of Patent: May 3, 2022

(54) CHROMATIC DISPERSION EQUALIZER ADAPTION SYSTEMS AND METHODS

(71) Applicant: Maxim Integrated Products, Inc., San Jose, CA (US)

(72) Inventor: Charles Razzell, Pleasanton, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/023,147

(22) Filed: Sep. 16, 2020

(65) Prior Publication Data

US 2021/0167864 A1 Jun. 3, 2021

Related U.S. Application Data

(60) Provisional application No. 62/942,045, filed on Nov. 29, 2019.

(51) Int. Cl.
*H04B 10/61* (2013.01)
*H04B 10/2513* (2013.01)
*H04L 25/03* (2006.01)

(52) U.S. Cl.
CPC ... *H04B 10/6161* (2013.01); *H04B 10/25133* (2013.01); *H04B 10/6162* (2013.01);
(Continued)

(58) Field of Classification Search
CPC ............ H04B 10/6161; H04B 10/6162; H04B 10/25133
(Continued)

(56) References Cited

U.S. PATENT DOCUMENTS 8,538,278 B2 * 9/2013 Batshon ............... H04J 14/06
398/205
8,989,602 B2 * 3/2015 Komaki ............ H04B 10/6166
398/208

(Continued)

OTHER PUBLICATIONS

Xu et al: "Chromatic dispersion compensation in coherent transmission system using digital filters", Optics Express, vol. 18, No. 15, Jul. 19, 2010, pp. 16243-16257. (Year: 2010).*

*Primary Examiner* — Li Liu
(74) *Attorney, Agent, or Firm* — North Weber & Baugh LLP; Michael North (57) ABSTRACT

Described herein are systems and methods that perform coarse chromatic dispersion (CD) compensation by applying precomputed coarse front-end equalizer (FEE) tap weights to a receiver based on an assumed propagation distance. After a waiting period, the FEE tap weights are applied, and it is determined whether the FEE tap weights cause a decision-directed tracking of channel rotations to satisfy a stability metric. In response to the stability metric not being satisfied, the assumed propagation distance is adjusted and used to obtain updated FEE tap weights. Conversely, if the stability metric is satisfied, a fine CD compensation is performed that comprises maintaining the updated FEE tap weights; performing an iterative least-mean-squared (LMS) error adaption to adjust Back-End Equalizer (BEE) tap weights and obtain updated BEE tap weights; and using the updated BEE tap weights to adjust the FEE tap weights to, ultimately, have the BEE output an equalized data bit stream.

16 Claims, 7 Drawing Sheets

(52) U.S. Cl.
CPC ................. *H04L 25/03006* (2013.01); *H04L 2025/03636* (2013.01)

(58) Field of Classification Search
USPC .......................... 398/81, 147, 159, 208, 209
See application file for complete search history.

(56) References Cited

U.S. PATENT DOCUMENTS

| | | | |
|---|---|---|---|
| 9,225,431 B1* | 12/2015 | Arabaci | H04B 10/25133 |
| 10,523,323 B2 | 12/2019 | Kang et al. | |
| 2005/0031355 A1* | 2/2005 | Shi | H04B 10/25133 |
| | | | 398/147 |
| 2005/0175081 A1* | 8/2005 | Zhidkov | H04L 1/006 |
| | | | 375/232 |
| 2010/0014873 A1* | 1/2010 | Bulow | H04B 10/6161 |
| | | | 398/159 |
| 2010/0046598 A1* | 2/2010 | Zhong | H04L 25/03343 |
| | | | 375/233 |
| 2010/0196009 A1* | 8/2010 | Qian | H04B 10/6162 |
| | | | 398/65 |
| 2012/0070159 A1* | 3/2012 | Ishihara | H04B 10/2513 |
| | | | 398/202 |
| 2012/0148266 A1* | 6/2012 | Komaki | H04L 25/03019 |
| | | | 398/210 |
| 2012/0155881 A1* | 6/2012 | Zhao | H04B 10/6971 |
| | | | 398/81 |
| 2013/0287390 A1* | 10/2013 | Abe | H04B 10/616 |
| | | | 398/26 |
| 2014/0219666 A1* | 8/2014 | Tselniker | H04L 27/2331 |
| | | | 398/208 |
| 2015/0229410 A1* | 8/2015 | Magri | H04B 10/6971 |
| | | | 398/26 |
| 2015/0280833 A1* | 10/2015 | Sun | H04J 14/06 |
| | | | 398/208 |
| 2015/0280853 A1* | 10/2015 | Sun | H04B 10/6161 |
| | | | 370/482 |
| 2015/0365174 A1* | 12/2015 | Nazarathy | H04L 27/2331 |
| | | | 398/209 |
| 2016/0050023 A1* | 2/2016 | Kaneda | H04B 10/6161 |
| | | | 398/208 |
| 2017/0149510 A1* | 5/2017 | Bolshtyansky | H04B 10/6163 |
| 2018/0159652 A1* | 6/2018 | Calabro | H04B 10/6165 |
| 2019/0052368 A1* | 2/2019 | Hu | H04L 25/03019 |
| 2019/0074903 A1* | 3/2019 | Takamuku | H04B 10/2507 |
| 2020/0052793 A1* | 2/2020 | Hamaoka | H04L 27/01 |

* cited by examiner

CHROMATIC DISPERSION EQUALIZER ADAPTION SYSTEMS AND METHODS

CROSS REFERENCE TO RELATED PATENT APPLICATIONS

This application is related to and claims the priority benefit, under 35 U.S.C. § 119(e), from US Provisional Patent Application, Ser. No. 62/942,045 entitled "Chromatic Dispersion Equalizer Adaption Systems and Methods," filed on Nov. 29, 2019 and listing as inventor Charles Razzell. Each reference mentioned in this patent document is incorporated by reference herein in its entirety and for all purposes.

BACKGROUND

The present disclosure relates generally to signal processing in high-speed telecommunication circuits. More particularly, the present invention relates to systems and methods that perform CD compensation in dual-polarization coherent optical transmission and similar applications. In the past few decades, telecommunication networks have seen an ever-increasing demand for bandwidth. Large available bandwidth is a major factor in the increasing popularity of high-speed optical communication systems—whether for transferring data from chip to chip or between Wide Area Network (WAN) fiber-optic links. For example, optical transceivers designed for short-distance (e.g., a few hundred meters) interconnects over optical fiber are in high demand in data center and campus networks. However, the presence of chromatic dispersion (CD) and other transmission impairments limit the rate at which data can be transported in an optical communication channel. Accordingly, it would be desirable to have low-complexity systems and methods that overcome the shortcomings of existing designs and mitigate the effects of chromatic dispersion, without the need for costly and complex signal digitization using DSPs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items. All documents cited herein are incorporated by reference herein in their entirety. In this document the term "tap weights" refers to weights, states, coefficients, or gains of filter taps.

Although embodiments described herein are given in the context of optical communication systems and methods, persons skilled in the art will recognize that the teachings of the present disclosure are not limited to optical communication applications and may equally be used in wired networks, satellite communication, and the like.

Coherent optical links communicate data over different communication channels that correspond to different phases and polarizations of an input signal to the fiber. In a dual-polarization coherent optical transmission system, X- and Y-polarization channels carry ideally independent in-phase (I) and quadrature phases (Q) of the X- and Y-polarizations, conventionally denoted as tributaries XI, XQ, YI and YQ—one for each branch—such that when level 4 pulse-amplitude modulation (4-PAM) is used, each branch yields two bits for every unit interval (UI), and the combination of all four branches yields a total of 8 bits per UI.

Figure 1:
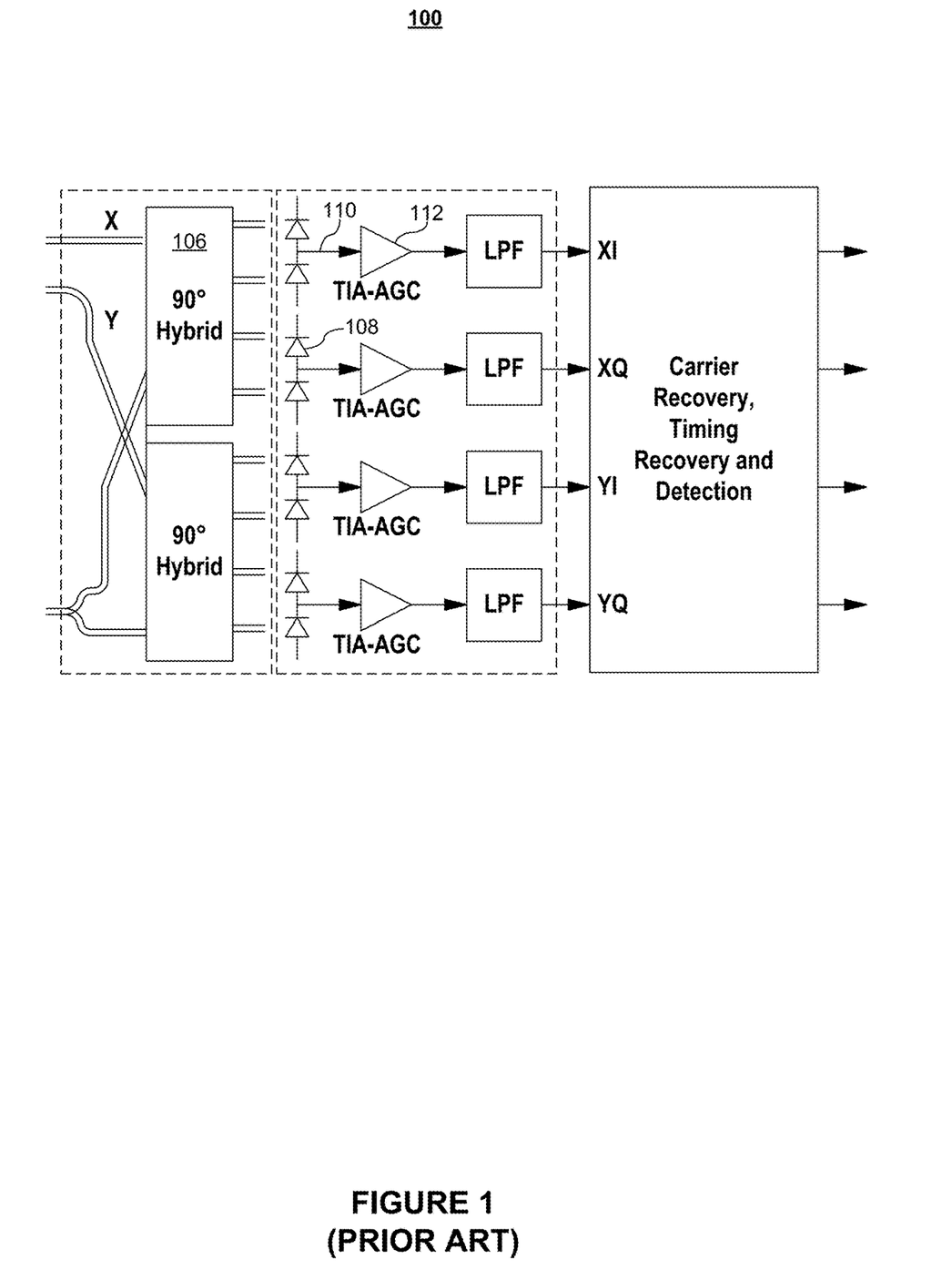
FIG. 1 is a block diagram of a conventional dual polarization quaternary amplitude modulation (DP-QAM) receiver architecture that is based on analog signal processing.

FIG. 1 is a block diagram of a conventional DP-QAM receiver architecture that is based on analog signal processing. Receiver 100 is a homodyne receiver driven by an on-channel laser (not shown) that acts as the local oscillator. The arrangement of the polarization beam splitter and 90° hybrids 106 is designed to provide balanced quadrature light outputs for each of the two orthogonal polarizations, conventionally labeled X and Y, which are incident on eight photodiodes 108 that are arranged in balanced pairs. This arrangement results in four bipolar photocurrents 110 that are amplified by respective Trans Impedance Amplifiers (TIAs) 112, corresponding to I and Q-phases of the X- and Y-polarizations, respectively. Thus, four branches of receiver 100, i.e., XI, XQ, YI, YQ, are available for further signal processing in the analog domain.

However, imperfections inherent to the transmitter, receiver 100, and optical fiber introduce unwanted delays that cause polarization and phase in the four channels to arrive at the receiver with unknown phase rotation and phase polarization dimensions that the receiver cannot identify from the recovered information.

For example, since the index of refraction of a fiber channel varies (typically decreasing for increasing wavelength in materials that do not absorb light) with the frequency of the light due to material properties or geometry of the fiber that acts as an optical waveguide, CD and corresponding group delay depend on the optical wavelengths propagated in the form of short pulses of light. Given a signal with sufficiently broad frequency bandwidth, depending on the medium and the wavelength, higher frequencies components of that signal will experience greater group delay than low-frequency components, such that higher frequency spectral components undergo a different delay in the transmission medium than lower frequency components of the same sign. As an example, the group delay dispersion of silica is +36 fs$^2$/mm at 800 nm and −22 fs$^2$/mm at 1500 nm. Zero group delay dispersion is reached close to 1270 nm. Such temporal spreading of a pulse, which represents the information, significantly increases bit-error rate (BER), decreases the rate at which data can be transported in a channel, and leads to a reduction of the opening in the so-called eye-pattern. This dispersion effect worsens with increasing length of the fiber, causing the BER to become unacceptable at lengths greater than a few km at 1550 nm and, thus, requiring electronic equalization to regenerate communication signals.

If CD were the only transmission impairment that is introduced, dispersion compensating fibers may be used. Alternatively, assuming that the type and length of the fiber are known, FEE tap weights could be initialized to values that allow for proper compensation of group delay effects caused by the fiber's characteristic.

In practice, however, determining suitable tap weights is rendered difficult by the fact that in many applications the type and exact length of the fiber that the system is connected to are not known a priori or are subject to change. This difficulty is exacerbated by the presence of additional impairments, such as channel-induced inter-symbol interference (ISI) that is caused by bandwidth limitations. Moreover, at the input to receiver 100, all polarizations may be mixed into each other, random phase orientations may exist, and there may be no reference point that would allow one to identify a valid signal. As a result, an attempt to change or adjust tap weights cannot rely on local decision-directed feedback for correction while an open-loop approach to computing the FEE coefficients is, on its own, unlikely to be sufficient to restore the signal integrity to an acceptable BER.

Therefore, it is desirable to have systems and methods that mitigate the effects of CD and increase the tolerance against resulting errors without the need for Nyquist-rate DSPs for signal digitization and without requiring human intervention.

Figure 2:
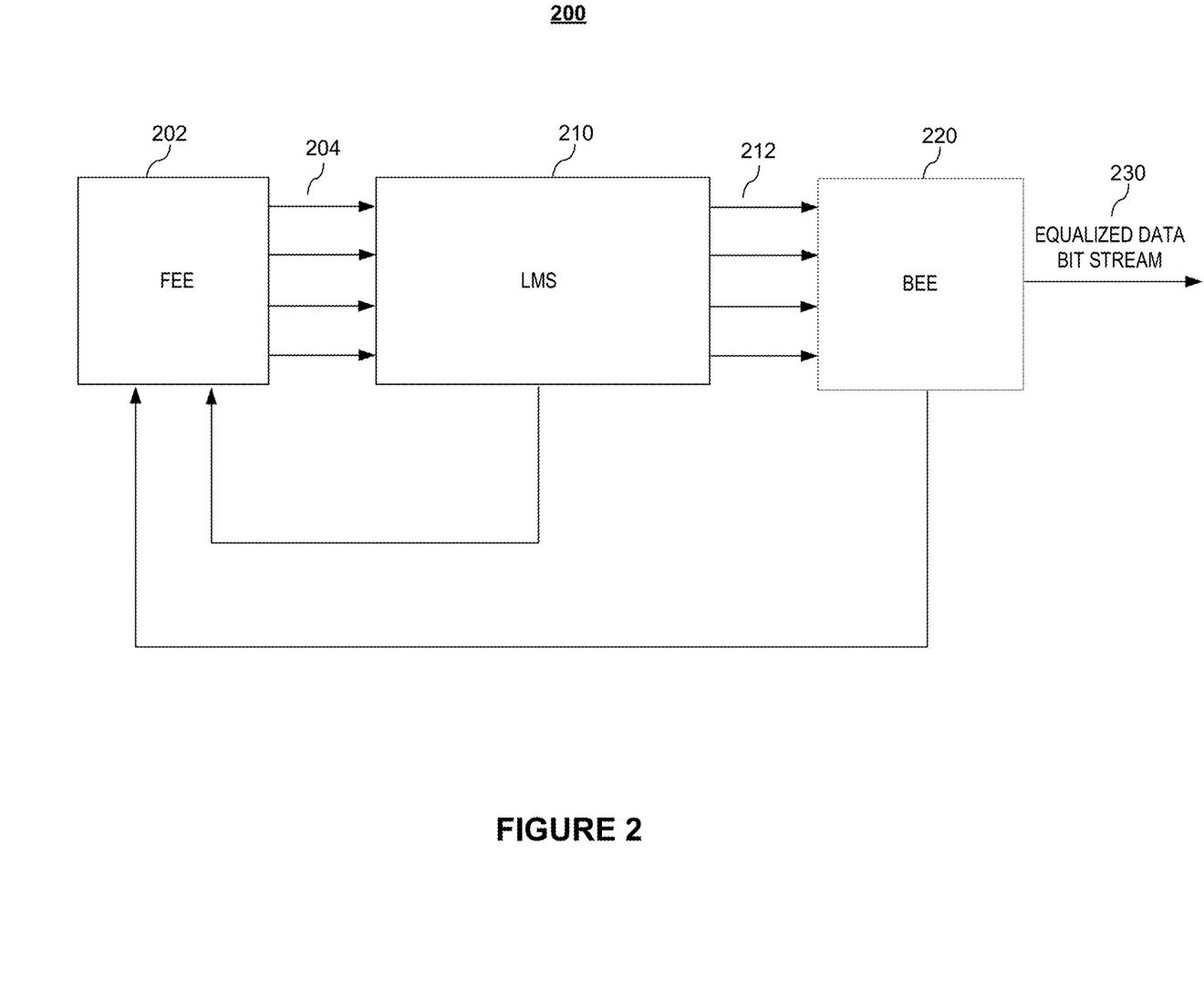
FIG. 2 illustrates and exemplary chromatic dispersion equalizer system according to embodiments of the present disclosure.

FIG. 2 illustrates and exemplary CD equalizer system according to embodiments of the present disclosure. System 200 comprises CD front-end equalizer (FEE) 202, LMS adaption circuit 210, back-end equalizer (BEE) 220. A person of skill in the art will appreciate that a frequency correction circuit may be placed before LMS adaption circuit 210. Such person will further appreciate that part or all of system 200 may be implemented as a single circuit. It is noted that FEE 202 typically has no cooperation from the transmitter (not shown), which may be connected to a random length fiber over which FEE 202 has no control. Embodiments of the present disclosure allow for any length of fiber and for transmitters to use any standard or proprietary protocol.

In operation, system 200 may perform CD equalization by using LMS adaption circuit 210 to perform an iterative LMS error adaption that adjusts tap weights in BEE 220. In embodiments, the BEE tap weights may be used to adjust tap weights in FEE 202. As a result, system 200 outputs data bit stream 230 that has been equalized. Advantageously, system 200 provides for some amount of blind adaption of tap weights in FEE 202 to mitigate the effects of CD.

As is known from the patent applications mentioned herein and incorporated by reference, existing electronic polarization control loops are useful for separating and phase-aligning dual polarization coherent signals. Least mean square (LMS) adaption is used in the coherent optical signal processor to track random phase rotations and other impairments. LMS adaption is performed using a continuous version of the classic RLMS update equation on eight coefficients held, for example, in analog integrators as charge on capacitors.

Eight coefficients represent a 2×2 complex matrix that is used to separate and phase correct the incoming analog signal:

$$\begin{bmatrix} E_{XO} \\ E_{YO} \end{bmatrix} = \begin{bmatrix} C_{1X} & C_{1Y} \\ C_{2X} & C_{2Y} \end{bmatrix} \begin{bmatrix} E_{XI} \\ E_{YI} \end{bmatrix}$$

Considering a dual-polarization coherent optical receiver having four independent branches, XI, XQ, YI, and YQ, that represent the I and Q components of two arbitrary orthogonal polarizations X and Y, and neglecting losses and dispersion in the optical channel, the observed X and Y signals in the receiver branches may be represented in complex notation as $$\begin{bmatrix} X_{in} \\ Y_{in} \end{bmatrix} = e^{i\psi/2} \begin{bmatrix} e^{i\phi_1/2} & 0 \\ 0 & e^{-i\phi_1/2} \end{bmatrix} \begin{bmatrix} \cos\theta & \sin\theta \\ -\sin\theta & \cos\theta \end{bmatrix} \begin{bmatrix} e^{i\phi_0/2} & 0 \\ 0 & e^{-i\phi_0/2} \end{bmatrix} \begin{bmatrix} E_{xi} \\ E_{yi} \end{bmatrix},$$

where $\psi$, $\phi_1$, $\theta$ and $\phi_0$ are four real parameters, $\psi$ represents the absolute phase, $\phi_0$ represents relative phase shift between X- and Y-polarization signals before a plane polarization rotation by $\theta$, and $\phi_1$ represents the relative phase shift afterwards. By multiplying all of these sub-components, a single 2×2 complex matrix is obtained that relates the received signal to the transmitted signal as follows:

$$\begin{bmatrix} X_{in} \\ Y_{in} \end{bmatrix} = \begin{bmatrix} \Gamma_{1X} & \Gamma_{1Y} \\ \Gamma_{2X} & \Gamma_{2Y} \end{bmatrix} \begin{bmatrix} E_{xi} \\ E_{yi} \end{bmatrix},$$

The matrix $\Gamma$ is unitary due to the factors that used to create it. Matrix $\Gamma$ is therefore invertible, and an estimate of the original transmitted waveforms may be obtained as:

$$\begin{bmatrix} \hat{E}_{xi} \\ \hat{E}_{yi} \end{bmatrix} = \begin{bmatrix} \Gamma_{1X} & \Gamma_{1Y} \\ \Gamma_{2X} & \Gamma_{2Y} \end{bmatrix}^{-1} \begin{bmatrix} X_{in} \\ Y_{in} \end{bmatrix}.$$

Thus, there exists a new demixing matrix, $C \triangleq \Gamma^{-1}$, which may be substituted into the above matrix equation to yield:

$$\begin{bmatrix} X_{out} \\ Y_{out} \end{bmatrix} \overset{def}{=} \begin{bmatrix} \hat{E}_{xi} \\ \hat{E}_{yi} \end{bmatrix} = \begin{bmatrix} C_{1X} & C_{1Y} \\ C_{2X} & C_{2Y} \end{bmatrix} \begin{bmatrix} X_{in} \\ Y_{in} \end{bmatrix}.$$

This represents two linear equations, each having two complex coefficients, i.e., $$X_{out} = C_{1X} X_{in} + C_{1Y} Y_{in}$$

and $$Y_{out} = C_{2X} X_{in} + C_{2Y} Y_{in}.$$

Although these two equations look independent, they derive from only four independent real parameters and, hence, the coefficients on the top and bottom rows of the matrix are not independent from each other. Nevertheless, they may be treated as independent for the purposes of iterating towards a solution as long as they do not converge in a manner such that the top and bottom rows are related to each other by a proportionality constant, i.e., $X_{out} = \alpha Y_{out}$, where $\alpha$ is the proportionality constant.

Solving one of these equations (and assuming that a similar technique may be applied to the other similar equation) provides $X_{out} = C_{1X} X_{in} + C_{1Y} Y_{in}$, in which only the observed signals $X_{in}$ and $Y_{in}$ are known. Although the estimated symbol $\hat{E}_{xi} = X_{out}$ is unknown, it is known that ideal samples of $X_{out}$ should be drawn from the finite alphabet of the modulation constellation in use, e.g., in 16-QAM modulation, which can be considered as 4-PAM signaling in each of the quadrature channels. Hence, for any candidate trial values of $C_{1X}$ and $C_{1Y}$, the error may be estimated as the difference between the nearest valid constellation point and the output signal $X_{out}$, denoted by $Q(X_{out})$ and $X_{out}$. Let $e(X_{out}) \triangleq Q(X_{out}) - X_{out}$. The quantizer, $Q$, may be defined as two 4-PAM modulation quantizers that operate, at least approximately, independently in the I- and Q-dimensions.

Based on the known complex LMS update equation, one may iterate towards a minimum error condition by accumulating into coefficients $C_{1X}$ and $C_{1Y}$ using the following update equations:

$$C_{1X} \Leftarrow C_{1X} + \mu(Q(X_{out}) - X_{out}) \cdot X^*_{in}$$

$$C_{1Y} \Leftarrow C_{1Y} + \mu(Q(X_{out}) - X_{out}) \cdot Y^*_{in}$$

$$X_{out} = X_{in} \cdot C_{1X} + Y_{in} C_{1Y}$$

Expanding the above complex expressions using:

$$X_{out} \triangleq X_{Iout} + iX_{Qout}; C_{1X} \triangleq C_{1XI} + iC_{1XQ}; C_{1Y} \triangleq C_{1YI} + iC_{1YQ};$$

$$C_{2X} \triangleq C_{2XI} + iC_{2XQ}; C_{2Y} \triangleq C_{2YI} + iC_{2YQ}$$

yields for computation of the output for real and imaginary parts of the X-polarization output:

$$X_{Iout} = X_{Iin} \cdot C_{1XI} - X_{Qin} \cdot C_{1XQ} + Y_{Iin} \cdot C_{1YI} - Y_{Qin} \cdot C_{1YQ}$$

$$X_{Qout} = X_{Qin} \cdot C_{1XI} + X_{Iin} \cdot C_{1XQ} + Y_{Qin} \cdot C_{1YI} + Y_{Iin} \cdot C_{1YQ}.$$

The coefficient update equations for the real and imaginary parts of upper row of the coefficient matrix are then:

$$C_{1XI} \Leftarrow C_{1XI} + \mu(Q(X_{Iout}) - X_{Iout}) \cdot X_{Iin} + \mu(Q(X_{Qout}) - X_{Qout}) \cdot X_{Qin}$$

$$C_{1XQ} \Leftarrow C_{1XQ} + \mu(Q(X_{Qout}) - X_{Qout}) \cdot X_{Iin} - \mu(Q(X_{Iout}) - X_{Iout}) \cdot X_{Qin}$$

$$C_{1YI} \Leftarrow C_{1YI} + \mu(Q(X_{Iout}) - X_{Iout}) \cdot Y_{Iin} + \mu(Q(X_{Qout}) - X_{Qout}) \cdot Y_{Qin}$$

$$C_{1YQ} \Leftarrow C_{1YQ} + \mu(Q(X_{Qout}) - X_{Qout}) \cdot Y_{Iin} - \mu(Q(X_{Iout}) - X_{Iout}) \cdot Y_{Qin}$$

Similarly, one may write for the Y-polarization output:

$$Y_{out} = X_{in} \cdot C_{2X} + Y_{in} C_{2Y},$$

which expands to:

$$Y_{Iout} = X_{Iin} \cdot C_{2XI} - X_{Qin} \cdot C_{2XQ} + Y_{Iin} \cdot C_{2YI} - Y_{Qin} \cdot C_{2YQ}$$

$$Y_{Qout} = X_{Qin} \cdot C_{2XI} + X_{Iin} \cdot C_{2XQ} + Y_{Qin} \cdot C_{2YI} + Y_{Iin} \cdot C_{2YQ}.$$

And the corresponding update equations are:

$$C_{2X} \Leftarrow C_{2X} + \mu(Q(Y_{out}) - Y_{out}) \cdot X^*_{in}$$

$$C_{2Y} \Leftarrow C_{2Y} + \mu(Q(Y_{out}) - Y_{out}) \cdot Y^*_{in}$$

which expand to:

$$C_{2XI} \Leftarrow C_{2XI} + \mu(Q(Y_{Iout}) - Y_{Iout}) \cdot X_{Iin} + \mu(Q(Y_{Qout}) - Y_{Qout}) \cdot X_{Qin}$$

$$C_{2XQ} \Leftarrow C_{2XQ} + \mu(Q(Y_{Qout}) - Y_{Qout}) \cdot X_{Iin} + \mu(Q(Y_{Iout}) - Y_{Iout}) \cdot X_{Qin}$$

$$C_{2YI} \Leftarrow C_{2YI} + \mu(Q(Y_{Iout}) - Y_{Iout}) \cdot Y_{Iin} + \mu(Q(Y_{Qout}) - Y_{Qout}) \cdot Y_{Qin}$$

$$C_{2YQ} \Leftarrow C_{2YQ} + \mu(Q(Y_{Qout}) - Y_{Qout}) \cdot Y_{Iin} - \mu(Q(Y_{Iout}) - Y_{Iout}) \cdot Y_{Qin}$$

The result is eight real-valued update equations that may be used to find the four complex coefficients of the demixing matrix. In embodiments of the present disclosure, these update equations may be implemented in the analog domain as continuous-time integrators.

In embodiments, 16-QAM or NRZ error detection is used in a feedback loop to track the complex coefficients of the 2×2 Jones matrix. In embodiments, to set suitable initial positive or negative tap weights that enable tracking and allow decisions, such as distinguishing the 16 points in a constellation, to be performed with confidence, LMS adaption circuit 210 may use a circuit, such as unitary forcer circuit disclosed in and U.S. Patent Application No. 62/931,122, filed on Nov. 5, 2019, entitled "ANALOG COHERENT SIGNAL PROCESSING SYSTEMS AND METHODS," listing as inventors Charles Razzell and Edem Ibragimov, and U.S. Patent Application No. 62/931,127, filed on Nov. 5, 2019, entitled "DYNAMIC ERROR QUANTIZER TUNING SYSTEMS AND METHODS," listing as inventors Charles Razzell, which applications are herein incorporated by reference as to their entire contents.

As mentioned therein, the unitary forcer may be used to estimate the numerator and denominator (or metrics associated therewith) of a correlation coefficient that represents a correlation between the first and the second row vectors of a coefficient matrix, e.g., an LMS-adapted inverse Jones matrix. In embodiments, the numerator exceeding by a predetermined amount a metric that represents the denominator may be representative of a correlation that is indicative of a predetermined fraction being exceeded. Such metric may comprise a product of anti-diagonal elements that exceed a product of main diagonal elements associated with the coefficient matrix. Excessive correlation indicates a possible misconvergence and is used to trigger a reset to an LMS algorithm.

In embodiments, a metric that represents a relatively low correlation between two rows of the Jones matrix may be used as a stability metric that reflects the current quality of the tracking of the polarization and carrier phase angles, which in turn depends on the success of the currently-chosen set of FEE tap weights to make the individual constellation points distinguishable. BEE 220 may be used to further equalize incoming signals, such that the ISI of the final output signal from the receiver is improved before being fed to a subsequent clock and data recovery circuit (CDR, not shown). Advantageously, conventional decision-directed error detection may then be used to drive the feedback loops since the carrier phase is already corrected by LMS block 210. As the LMS loop continuously adapts, BEE 220, in effect, overcomes a shortcoming caused by FEE 202 which has a limited number of taps. In embodiments, the residual ISI at the input to BEE 220 obtained in terms of the tap weights that arise in BEE 220 may, thus, be used to determine how to adjust FEE 202, as discussed in greater detail with reference to FIG. 3.

Figure 3:
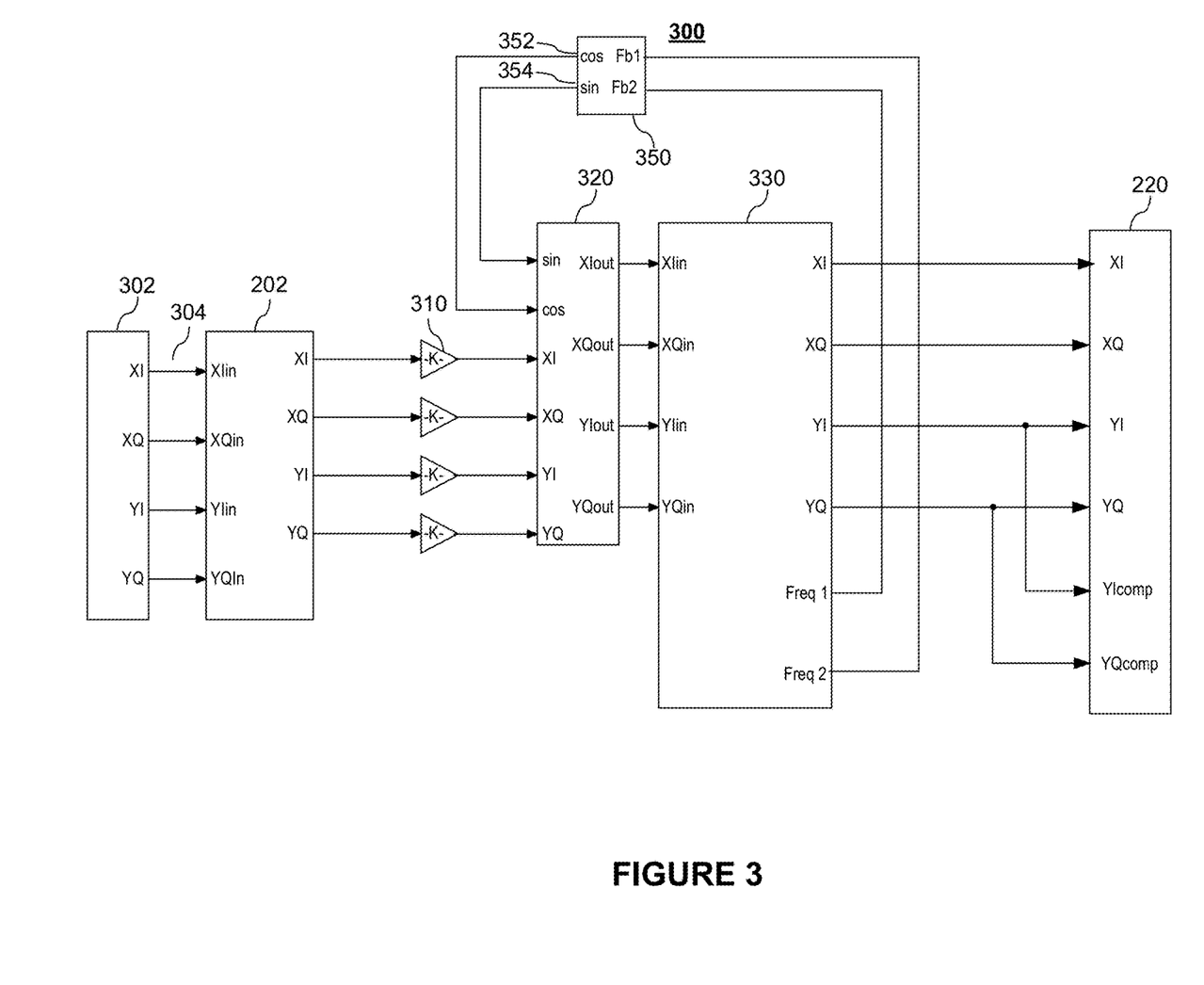
FIG. 3 illustrates and exemplary circuit implementation of a chromatic dispersion equalizer system according to embodiments of the present disclosure.

FIG. 3 illustrates and exemplary circuit implementation of a CD equalizer system according to embodiments of the present disclosure. CD equalizer system 300 comprises CD FEE 202, carrier frequency offset (CFO) 320, polarization and carrier phase correction circuit 330, BEE 220, and digitally controlled oscillator (DCO) 350.

In embodiments, receiver input 302 receives four uncorrected electrical signals 304 that may comprise of a mixture of X- and Y-polarizations representing respective receiver branches XI, XQ, YI, and YQ. Signals 304 may output by differential TIAs that, similar to FIG. 1, monitor four pairs of photodiodes (not shown). FEE 320 may be used to reduce or eliminate CD, ISI, and receiver skew. It is understood that FEE 320 may be implemented as a number of analog FEEs, e.g., one for X-polarization and one for Y-polarization, that utilize tap weights chosen such as to cause the down-stream receiver feedback loops to lock correctly. Receiver input 302 may be passed to four analog FIR filters within FEE 202 that each may have the same structure and comprise a number of time delays, e.g., implemented as on-chip transmission lines.

In embodiments, coarse values for the tap weights for FEE 202 may be stored in memory as corresponding entries in a look-up table that may specify a set of suitable, e.g., precomputed, FIR coefficients for an assumed propagation distance discussed further below. In embodiments, four independently determined coefficient vectors may be used.

In embodiments, FEE 202 is implemented as a T/2-spaced FEE. However, this is not intended as a limitation on the scope of the present disclosure as any different spacing may be selected. As a person of skill in the art will appreciate, if. If the taps in FEE 292 are too closely spaced in the time, hardware resources such as multiplier and adders are wasted. Therefore, the spacing should be chosen such as to provide sufficient, but not excessive, resolution in the frequency response.

Polarization and carrier phase correction circuit 330 may comprise error slicers, adaption circuits, complex multipliers, and supervisory control circuitry. Circuit 330 may be viewed as four complex multipliers that are representative of the Jones matrix. The multipliers multiply a time-varying 2×2 complex matrix by four input signals (e.g., 304) that each may be viewed as two complex signals, where the complex tap weights may be continuously adapted by using the LMS update equation, or any other weight updating method such as RLS, to correct for the polarization and phase rotations in the optical channel.

In embodiments, adaption of the complex coefficients of the 2×2 Jones matrix may be implemented by one analog LMS loop, e.g., within circuit 330, for each coefficient. In embodiments, to correct for polarization and phase changes in the fiber, four real error slicers may monitor and compare the error, which may be a time-varying signal, to an ideal constellation and, based on the comparison, drive four complex adaption circuits that determine four complex coefficients for the Jones matrix.

In embodiments, CFO 330 correction multiplies respective X- and Y-branches with a complex local oscillator signal provided on sin 374 and cos 374 input ports. In embodiments, BEE 350 may use a 4-PAM decision-based error signal (or 16-QAM if considered two-dimensionally) to train an iterative analog complex LMS with, e.g., five complex taps. BEE 350 performs residual ISI correction iteratively performing a gradient search that selects tap weights such as to minimize the mean squared error between the output signal and an ideal set of modulation constellation values. This has the beneficial effect of inverse filtering the low-pass filtering effect caused by amplifier parasitics along with any other sources of residual ISI (e.g., incomplete equalization in the FEE). A gain block in the error feedback loop (not shown) may be used to adjust the speed of adaption. The output of BEE 350 comprises corrected 4-PAM signals that may be fed into a CDR and decision slicer (not shown) to obtain desired symbols.

In embodiments, system 300 performs CD equalization by applying to FEE 202 control parameters, such as tap weights that have been precomputed by using an assumed propagation distance, to provide a coarse CD compensation. In embodiments, e.g., after waiting a predetermined period of time, it may be determined whether the tap weights, as, a performance measure, have caused a decision-directed tracking of channel phase and polarization rotations to satisfy the stability metric discussed with reference to FIG. 2. As a person of skill will appreciate, circuit 300 should track and, thus, provide a stable frame of reference to BEE 220 before BEE 220 is tasked with informing FEE 202.

If the stability metric has not been satisfied, the assumed propagation distance may be adjusted to update, e.g., in parallel, the tap weights in FEE 202, iterative followed by another performance measure, etc. Conversely, if the stability metric has been met, an iterative LMS error adaption may be enabled to adjust tap values in BEE 220 to obtain updated BEE tap weights. In embodiments, system 300 may iteratively (e.g., linearly) sweep through a plurality of propagation distances until the stability metric is satisfied. In embodiments, system 300 may utilize a binary search, where the decisions directing the search are informed by the sign of one or more tap weights obtained from BEE 220, e.g., after allowing time for convergence. If FEE 202 underestimates the propagation distance, BEE 220 may increase compensation by setting coefficients relatively high, for example, assuming three taps, BEE 220 may set a relatively high positive value for the center tap and negative values for the second and third tap. Therefore, the sign of the center tap weight may be optionally used to steer selection of the tap weights of FEE 202.

In embodiments, precomputing FEE 202 tap weights comprises a quantization step in which the nearest row in a lookup table corresponding to a distance shorter than the actual propagation distance is used. For example, if a CD coefficient is precomputed in coarse steps of, e.g., 0.5 km steps, starting at 0 km, the values in that row of the lookup table that are closest in propagation distance to the (initially unknown/assumed) distance that is shorter than true value should be chosen, in effect, selecting a mathematically rounded-up value(s), iteratively, until the stability metric satisfied. In embodiments, the magnitude and sign of the center tap of BEE 220 may be used as an indicator of the degree that the CD compensation in FEE 202 is too high or too low, e.g., combined with thresholds on the magnitudes of the tap weights of BEE 220 to determine whether the residual error is sufficient to warrant further updates to FEE 202. This indicator may then be used to increment, decrement, or leave in place the currently selected row in front-end equalizer look-up table. In practice, the longest propagation distance that still generates a positive sign for the center tap should be chosen. The remaining, uncompensated CD may be absorbed by complex LMS BEE 220, e.g., along with any residual ISI. Once FEE 202 approaches the true value of the propagation distance, BEE 220 can adjust to make smaller corrections, e.g., by lowering the value for the center tap.

Conversely, if FEE 202 overestimates the propagation distance, BEE 220 may compensate in the opposite direction, e.g., to undo an overcompensation, by reversing the signs of the taps. This method effectively splits CD correction duties between the taps of FEE 202 and taps of adaptive BEE 220 and advantageously utilizes all available taps. Once updated BEE tap weights are obtained, they may be used to adjust the tap weights in FEE 202, ultimately causing BEE 220 to output an equalized data bit stream that is substantially free from polarization and phase control errors and is suitable for CD adaption error feedback.

In short, monitoring and adjusting tap values of FEE 202 enables BEE 220, unlike FEE 202, to train itself. In embodiments, fixed tap values of FEE 202 may be updated as necessary, thereby, allowing a wide tolerance in the otherwise fixed tap values of FEE 202, while achieving acceptable system performance.

The fact that the complex tap weights of analog BEE 220 continuously adapt, i.e., update, at a relatively slow rate, makes it cost-effective to observe them. Therefore, by observing taps at a rate significantly below the (e.g., 50 Gbaud) signal rate, advantageously, no digital solution is required, such that the effects of CD on high-speed optical communication signals can be compensated or eliminated without the use of costly and power-hungry digitization by ADCs and subsequent processing by fast DSP hardware.

One additional advantage of using an approach that utilizes both FEE 202 and BEE 220 is that BEE 220 may have a reduced number of complex and costly analog taps, e.g., three instead of five taps, thus, significantly reducing system power and, in some applications, allowing BEE 220 to switch off once convergence has been assured in FEE 202 to further reduce power consumption.

Figure 4A:
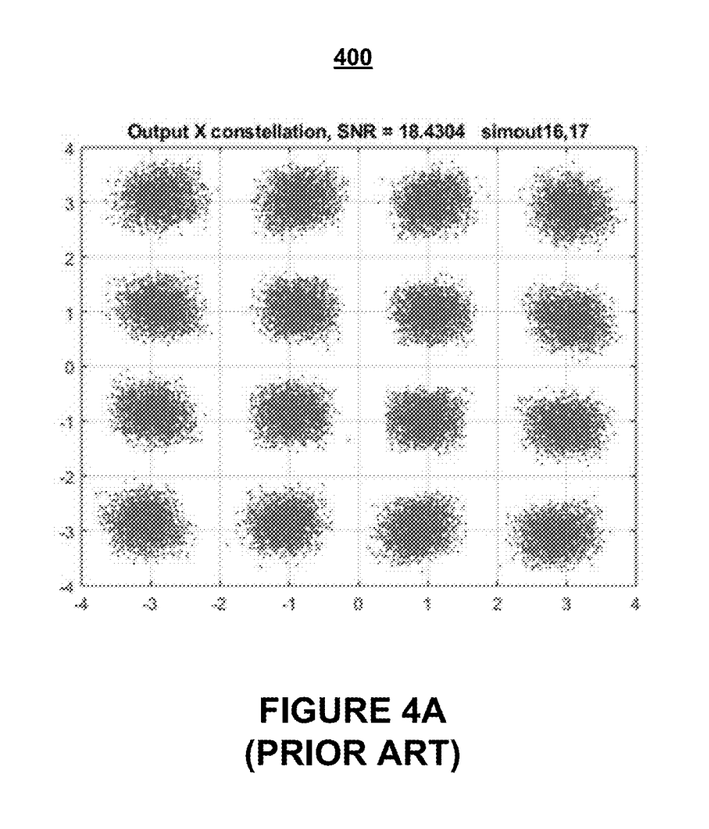
FIG. 4A and FIG. 4B show simulation results for constellation diagrams for X- and Y polarization outputs for a prior art equalizer design.
Figure 4B:
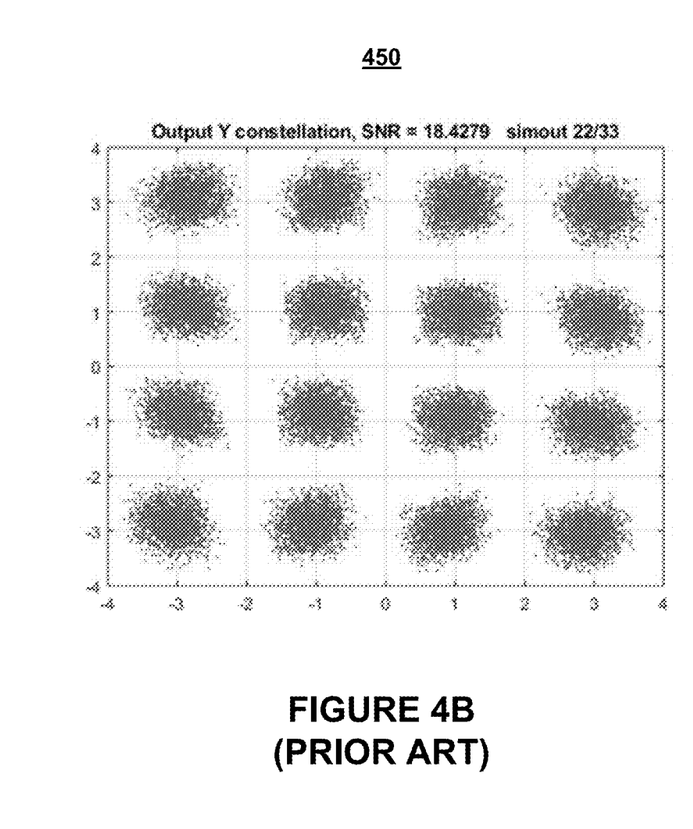
Figure 5A:
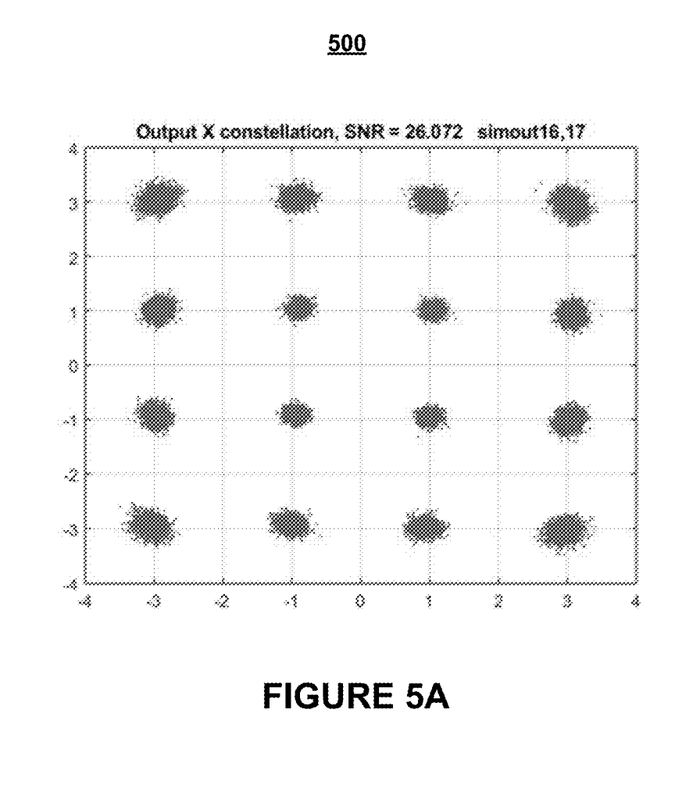
FIG. 5A and FIG. 5B show improved simulation results for constellation diagrams for X- and Y polarization outputs using a CD equalizer system according to embodiments of the present disclosure.
Figure 5B:
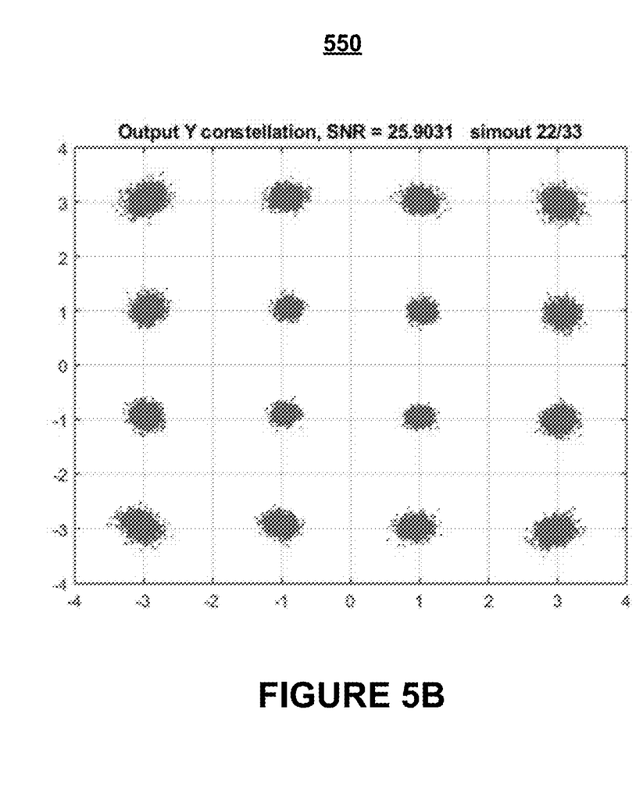

FIG. 4A and FIG. 4B show simulation results for constellation diagrams for X- and Y polarization output channels for a prior art equalizer design. FIG. 5A and FIG. 5B show improved simulation results for constellation diagrams for X- and Y polarization output channels using a CD equalizer system according to embodiments of the present disclosure. It is noted that to make the simulations mathematically more convenient, linear algebra approaches were used to perform matrix multiplications to generate simulation results 400-550. Since convolving two polynomials results in a large number of taps that may exceed the capacity, in embodiments, the problem may be treated as a frequency domain problem, and the tap weights of BEE 220 may be converted into a frequency domain response that may then be applied to FEE 202 in the frequency domain, for example, by treating the frequency response as that of a generalized filter that indicates where to adjust the gain.

Figure 6:
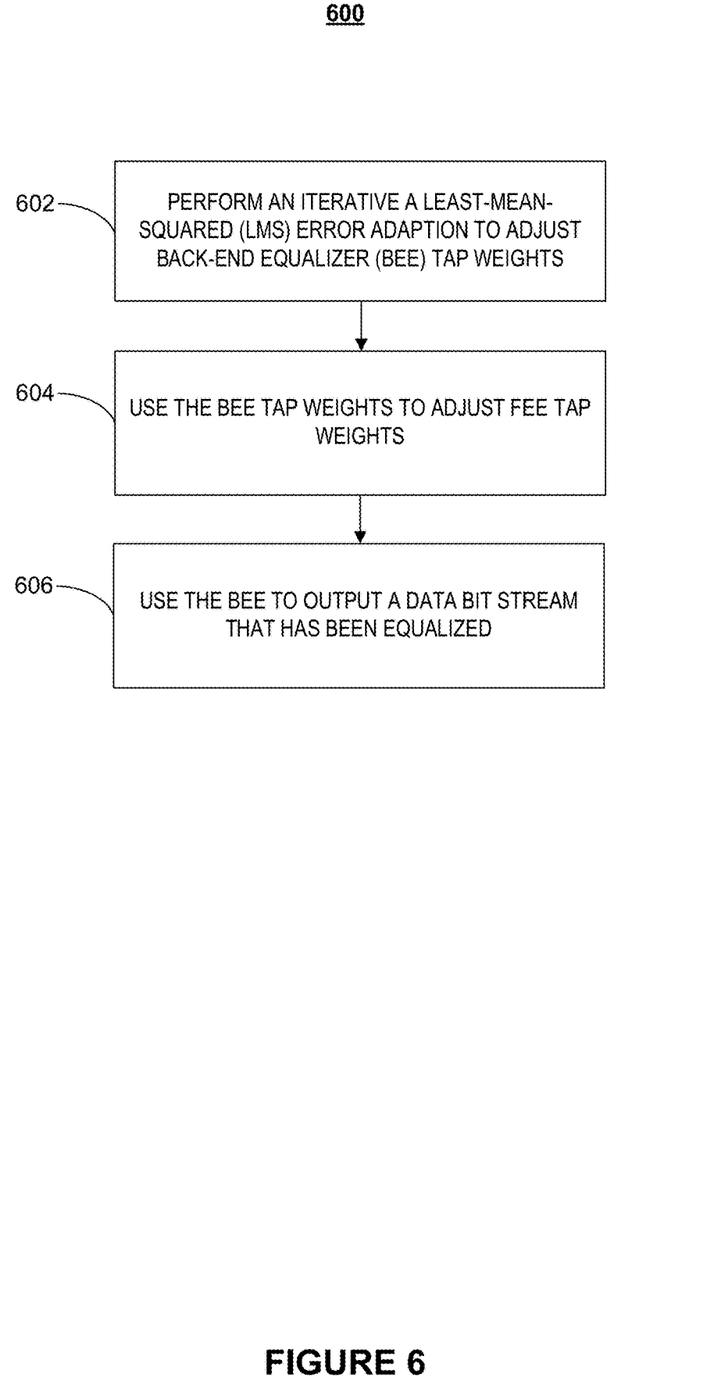
FIG. 6 is a flowchart of an illustrative process for CD equalization, according to embodiments of the present disclosure.

FIG. 6 is a flowchart of an illustrative process for CD equalization, according to embodiments of the present disclosure. In embodiments, CD equalization process 600 begins at step 602 when an iterative LMS error adaption is performed to adjust BEE tap weights. At step 604, the BEE tap weights may be used to adjust FEE tap weights. Finally, at step 606, the BEE may be used to output a data bit stream that has been equalized. It is noted that process steps disclosed herein may optionally be performed. Steps may not be limited to the specific order set forth herein and may be performed in different orders or concurrently.

Figure 7:
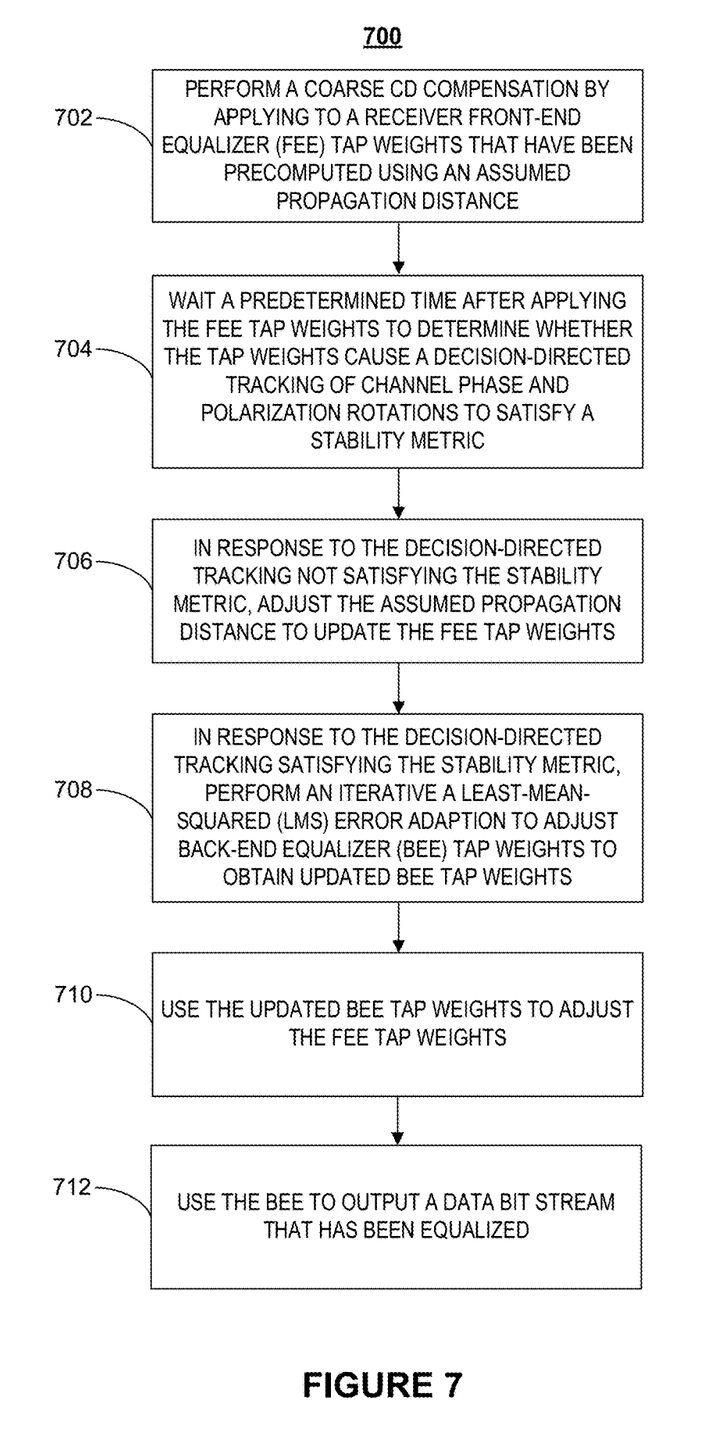
FIG. 7 is a flowchart of another illustrative process for CD equalization, according to embodiments of the present disclosure.

FIG. 7 is a flowchart of another illustrative process for CD equalization, according to embodiments of the present disclosure. Process 700 begins at step 702 when, a coarse CD compensation is performed by applying to a receiver FEE tap weights that have been precomputed using an assumed propagation distance.

At step 704, e.g., after waiting a predetermined time after applying the FEE tap weights, it is determined whether the tap weights have caused a decision-directed tracking of channel phase and polarization rotations to satisfy a stability metric.

At step 706, in response to the decision-directed tracking not satisfying the stability metric, the assumed propagation distance may be adjusted to update the FEE tap weights.

Conversely, if the decision-directed tracking satisfies the stability metric, an iterative LMS error adaption may be performed to adjust BEE tap weights to obtain updated BEE tap weights, at step 708.

At step 710, the updated BEE tap weights may be used to adjust FEE tap weights.

Finally, at step 712, the BEE may be used to output a data bit stream that has been equalized.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using Application Specific Integrated Circuits (ASICs), programmable arrays, digital signal processing circuitry, or the like. Accordingly, the terms in any claims are intended to cover both software and hardware implementations. The term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A chromatic dispersion (CD) equalization method comprising:
    performing a coarse CD compensation by applying a first set of tap weights to a receiver;
    performing iterative steps comprising:
        determining whether the first set of tap weights causes a decision-directed tracking of channel rotations to satisfy a stability metric;
        in response to the decision-directed tracking not satisfying the stability metric, performing steps comprising updating the first set of tap weights; and
        in response to the decision-directed tracking satisfying the stability metric, performing a fine CD compensation comprising:
            performing an iterative least-mean-squared (LMS) error adaption to adjust a second set of tap weights to obtain updated tap weights; and
            using the updated tap weights to adjust the first set of tap weights; and
    outputting by the receiver a data bit stream that has been equalized by a combination of the first set of tap weights and the second set of tap weights.

2. The CD equalization method according to claim 1, wherein the decision-directed tracking of channel rotations comprises tracking of channel phase and polarization rotation.

3. The CD equalization method according to claim 2, wherein the tracking of channel phase and polarization rotation comprises LMS tracking.

4. The CD equalization method according to claim 1, wherein the stability metric comprises a metric that indicates a degree of success of discerning separate constellation points.

5. The CD equalization method according to claim 4, wherein the stability metric comprises a correlation between pairs of multiplicative coefficients used to perform polarization demixing.

6. The CD equalization method according to claim 4, wherein performing the iterative steps comprises sweeping through a plurality of distances until the stability metric is satisfied.

7. The CD equalization method according to claim 4, wherein performing the iterative steps comprises a non-linear search of distances until a residual inter-symbol interference (ISI) is reduced, the residual ISI having been deduced once the second set of tap weights have converged.

8. The CD equalization method according to claim 1, wherein adjusting the updated tap weights comprises convolving the first set of tap weights with the second set of tap weights, the second set of tap weights being calculated by allowing an adaptive equalizer to converge.

9. The CD equalization method according to claim 1, wherein the first set of tap weights comprise precomputed values that have been precomputed before performing the iterative steps.

10. The CD equalization method according to claim 9, further comprising, at a start-up condition, selecting from a lookup table a nearest row that corresponds to a propagation distance that is shorter than an actual propagation distance, wherein selecting comprises incrementing the propagation distance and observing magnitude and sign of a center tap after the LMS error adaption.

11. The CD equalization method according to claim 1, further comprising, in response to receiving from a back-end equalizer CD adaption error feedback data that is substantially free from polarization and phase control error, generating CD-equalized data.

12. The CD equalization system according to claim 1, wherein the iterative LMS error adaption uses an error slicer that has been adapted for PAM or QAM modulation.

13. The CD equalization system according to claim 1, wherein the iterative LMS steps error adaption comprises a non-linear search of distances until a residual inter-symbol interference (ISI) is reduced, the residual ISI having been deduced once the BEE tap weights have converged.

14. A chromatic dispersion (CD) equalization system comprising:
  a Front-End Equalizer (FEE) comprising a set of FEE tap weights; and
  a Back-End Equalizer (BEE) comprising a set of BEE tap weights that are adjusted by an iterative least-mean-squared (LMS) error adaption and made available to the FEE that uses the BEE tap weights to adjust the FEE tap weights, the BEE outputting a data bit stream that has been equalized, wherein, at a start-up condition, the FEE tap weights are selected from a lookup table comprising precomputed values by selecting a nearest row that corresponds to a propagation distance shorter than an actual propagation distance, wherein selecting comprises incrementing the propagation distance and observing magnitude and sign of a center tap after the iterative LMS error adaption.

15. A chromatic dispersion (CD) equalization system comprising:
  a Front-End Equalizer (FEE) comprising a set of FEE tap weights; and
  a Back-End Equalizer (BEE) comprising a set of BEE tap weights that are adjusted by an iterative least-mean-squared (LMS) error adaption and made available to the FEE that uses the BEE tap weights to adjust the FEE tap weights, the BEE outputting a data bit stream that has been equalized, wherein using the BEE tap weights to adjust the FEE tap weights comprises convolving a first set of tap weights with a second set of tap weights to obtain a third set of tap weights followed by discarding edge tap weights of the third set of tap weights.

16. A chromatic dispersion (CD) equalization system comprising:
  a Front-End Equalizer (FEE) comprising a set of FEE tap weights; and
  a Back-End Equalizer (BEE) comprising a set of BEE tap weights that are adjusted by an iterative least-mean-squared (LMS) error adaption and made available to the FEE that uses the BEE tap weights to adjust the FEE tap weights, the BEE outputting a data bit stream that has been equalized, wherein the iterative LMS error adaption is performed in response to determining that the FEE tap weights cause a decision-directed tracking of channel rotations to satisfy a stability metric, and wherein the stability metric comprises a correlation between pairs of multiplicative coefficients used to perform polarization demixing.

* * * * *